Nov. 27, 1962  C. MATARRESE  3,065,779
COMBINATION FOOD GRINDING, GRATING, PULVERIZING
AND SLICING MACHINE
Filed Nov. 15, 1960  2 Sheets-Sheet 1

INVENTOR
CARLO MATARRESE

BY Mason, Mason & Albright
ATTORNEYS

Nov. 27, 1962  C. MATARRESE  3,065,779
COMBINATION FOOD GRINDING, GRATING, PULVERIZING
AND SLICING MACHINE
Filed Nov. 15, 1960
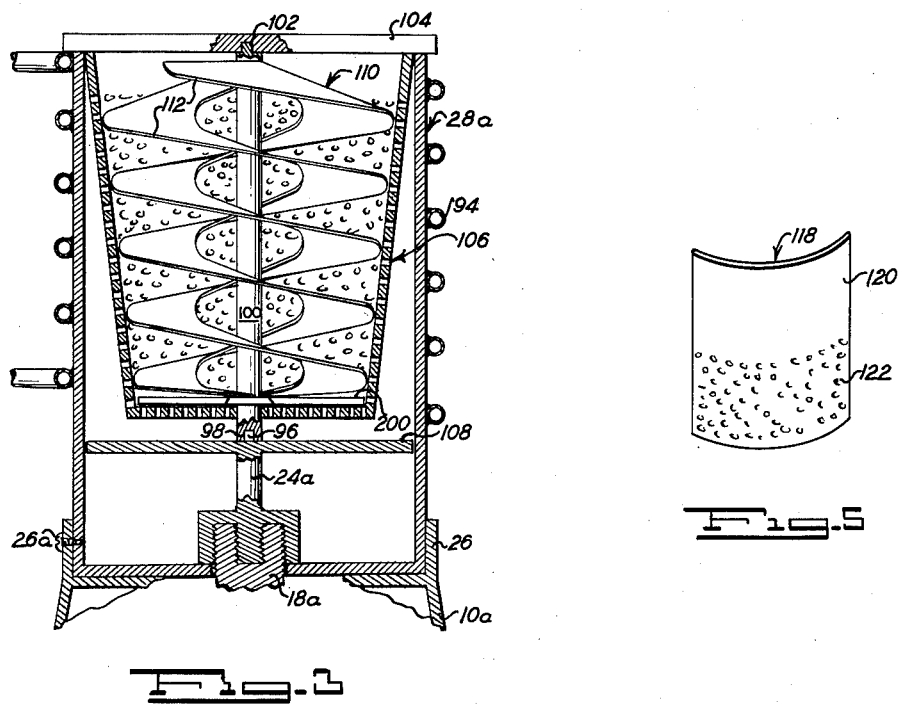
Fig. 2
Fig. 5
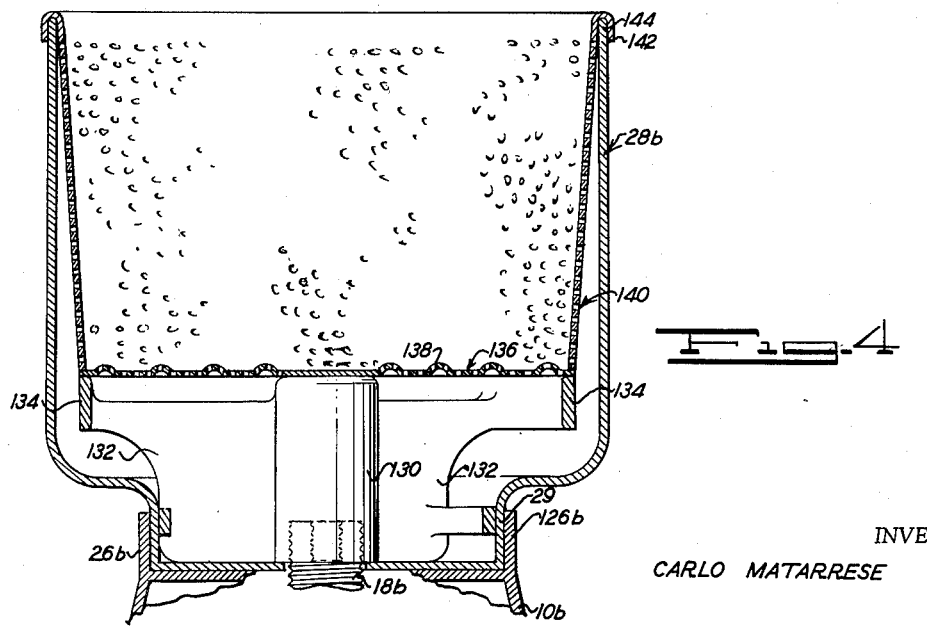
Fig. 4
INVENTOR
CARLO MATARRESE
BY Mason, Mason & Albright
ATTORNEYS United States Patent Office 3,065,779
Patented Nov. 27, 1962

3,065,779
COMBINATION FOOD GRINDING, GRATING, PULVERIZING AND SLICING MACHINE
Carlo Matarrese, % M.C.A. Machinery Corp., 59—21 150th St., Flushing 55, N.Y.
Filed Nov. 15, 1960, Ser. No. 69,356
7 Claims. (Cl. 146—76)

This invention relates to a combination food grinding, slicing, grating, pulverizing, and mascerating machine which comprises an improvement over the machines and methods described and claimed in my Patents Nos. 2,483,-472, granted October 4, 1949; 2,691,997, granted October 19, 1954; and 2,730,148, granted January 10, 1956, particularly that of Patent 2,691,997. Machines of this type are adapted, by the interchange of the various types of cutters, slicers, graters, and pulverizers, to perform in the same machine various types of operations on materials. For instance, the present machine by an interchange of the operating parts may peel potatoes with or without water, make meat balls, slice, chop, or roll such meats as ham, chicken, turkey, beef or veal. The present machine may also operate upon practically all types of vegetables, fruits, including fruit rinds and seeds, as well as cheese and bread.

A primary object of the invention is to provide in a single machine means for performing all of the operations noted above on various food products set out in Patent 2,691,997 and others in a better and more efficient manner than has been possible to accomplish heretofore.

An additional primary object is to provide a method and means for performing these operations while simultaneously chilling or partly freezing the foods, or heating the foods being processed, both heating and cooling of the foodstuffs being thermostatically controlled.

Other objects will appear hereinafter throughout the specification.

In the drawings:

FIGURE 2 is a vertical sectional view of the structure shown in FIGURE 1, the parts being assembled and some of them being shown in full lines for a clearer understanding of the invention;

FIGURE 3 is a vertical sectional view with some of the parts shown in full lines, of a second form of hopper, the base being broken away and shown in section;

FIGURE 4 is a view similar to FIGURE 3 of a third form of the invention; and

FIGURE 5 is a front perspective view of a combined hopper gate and screen.

Figure 1:
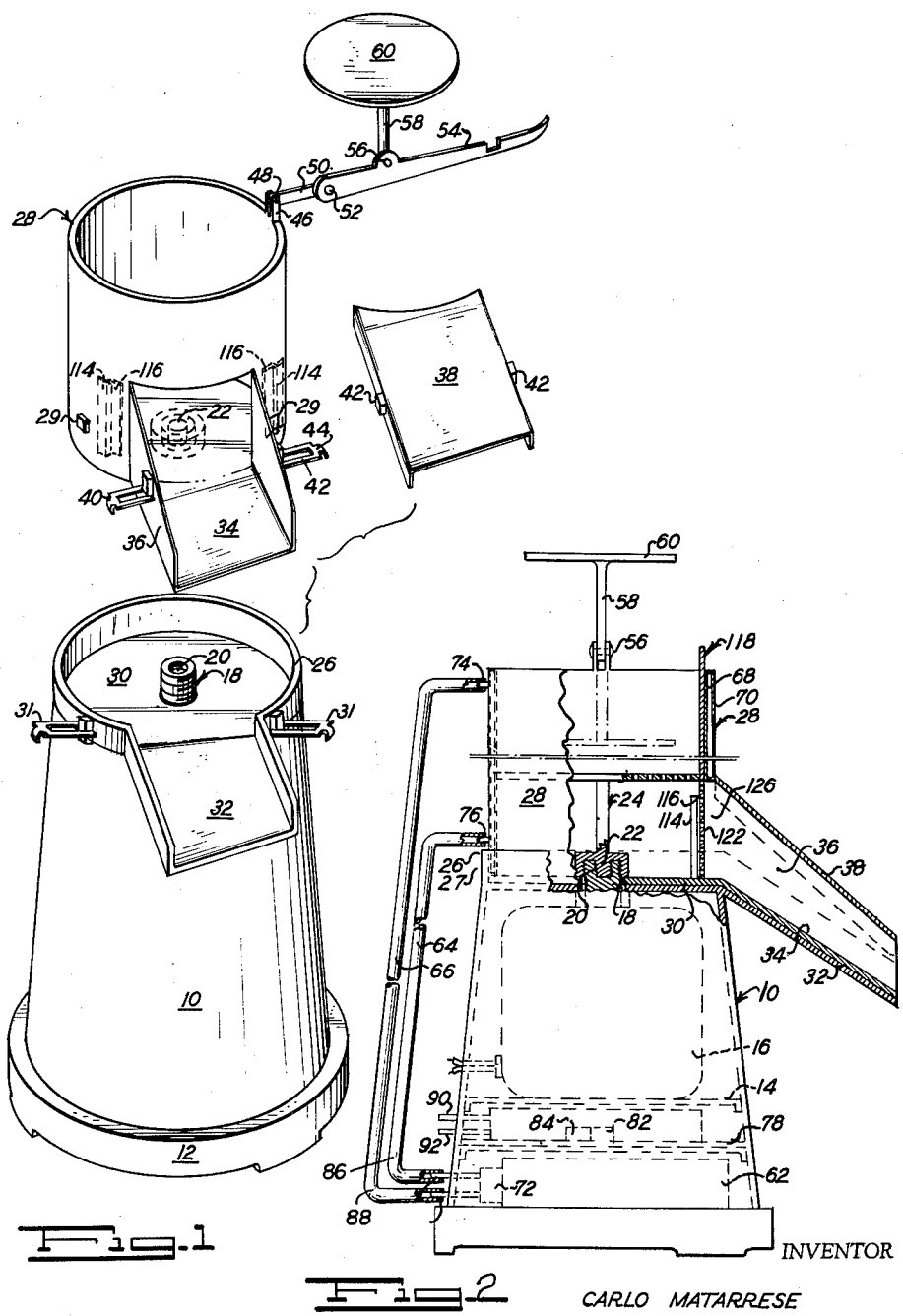
FIGURE 1 is an exploded perspective view of one form of the invention showing the food container and the chute cover removed.

Referring now to FIGURES 1 and 2, 10 indicates a housing and 12 a stand for the same. This housing has a floor 14 for supporting an electric motor 16 within the housing 10. Motor 16 is provided with a drive shaft 18 having a hollow screw-threaded end 20 adapted to be engaged by the screw-threaded end 22 of a vertically supported implement drive shaft 24. Screw-threaded socket 20 may provide the entire support for shaft 24.

The upper portion of the casing 10 is provided with an upstanding collar 26 in which is adapted to seat a receptacle 28. Snap hooks 31 are placed around collar 26 which close over extensions 29, firmly fastening receptacle 28 in place. The collar 26 extends upwardly from the casing, and at its junction thereto there is a floor 30 through which motor shaft 18 extends and upon which the receptacle is adapted to rest, the latter having a trough 32 over which lies the trough 34 of the receptacle.

Trough 34 has sides 36 and a detachable top or cover 38, trough having hook members 40 which are adapted to snap in slots 42 of straps 44 attached to the sides 36, the cover being made of sheet metal. The cover 38 is provided with lugs 42' for engagement by the slots 44, as stated hereinafter. The hook members may be readily snapped into the slots of the straps when it is desired to attach the cover to the trough. Screw means, such as a screw 26a as seen in FIGURE 3, extending through collar 26 may be used for removably engaging one of the sides of the receptacle 28 in each of the forms of the invention.

The receptacle may contain meat, vegetable, or fruit compressing means, the same consisting of an upstanding arm 46 having a pivot 48, a pivoted arm 50 which is connected at 48 to said arm 46 and also having a second pivot 52 at its opposite ends for connection to the arm 54. This arm between its ends is provided with a pivot 56 for pivotally supporting arm 58 upon which the compressing element 60 is mounted.

While the edible materials are being forced down within the receptacle by element 60, they may be acted upon by any one of the graters, slicers, or other devices shown in FIGURES 5, 9, 10, 11, 12, 12A, 13, 14, 15 or 24 of my Patent 2,691,997. The underside of any one of these elements may be provided with veins corresponding to veins 95 of my aforesaid patent, it being understood (although not shown) that the graters, etc., may be mounted on the end of the shaft 24 by any suitable keying means, such as shown in FIGURE 11 at 66 and 67 in the said patent.

Referring to FIGURE 2, as diagrammatically shown, mounted on the base and within the casing 10 is a refrigerating compressor element of the type generally used in refrigerators, the same being indicated by reference numeral 62. Circulating pipes 64 and 66 in this element extend from the refrigerating device 62 to the space between the walls 68 and 70 of the receptacle 28 whereby refrigerant may be circulated between the said walls 68 and 70 as controlled by thermostat 72, also indicated diagrammatically in FIGURE 2. The pipes 64, 66 are detachably connected at 74 and 76 to the receptacle 28 and at 86 and 88 to the refrigerating device 62. Utilizing this construction, including the readily detachable connection of the pipes 64 and 66 with the receptacle, it will be possible to chill the contents of the receptacle while the food materials are being worked upon by any one of the implements shown in the several figures of the patent referred to above and in the figures of the drawings herein.

Reference numeral 78 indicates suitable insulation which may be an asbestos pad or other insulating material upon which rests a smaller receptacle 80 having a heating element, diagrammatically illustrated at 82, therein and a thermostat, also diagrammatically illustrated at 84.

Flexible pipes 64 and 66 are also detachably connected at 86 and 88 to the refrigerating mechanism, and these pipes may be removed and attached to the detachable connections 90 and 92 which are located at the left end of receptacle 80. Preferably the heating fluid and cooling fluid are different. The chilling fluid should have a low-temperature boiling point, and the heating fluid should have a high-temperature boiling point. For instance, one of the Freons may be used as the chilling fluid and water may be used for heating. For this reason, two systems should be used. In this manner, the food may be either heated or cooled during processing.

In the structure shown in FIGURE 3, wherein the parts which correspond to those in FIGURES 1 and 2 are correspondingly numbered but with the addition of "a," the receptacle 28a is provided with a solid wall about which is located by brazing, etc. to the outside wall of said receptacle a coil, the ends of which, not shown, are removably connected to pipes corresponding to pipes 64 and 66 of FIGURE 2, the same being removably connected to said receptacle at one of their ends, the other of their ends being connected to heating or cooling mechanism corresponding to that shown diagrammatically in FIGURE 2.

In FIGURE 3 also, the vertical shaft at 24a, and corresponding to shaft 24 in FIGURE 2, is provided with a key 96 which is drivingly connected by means of a slot 98 to shaft 100. The upper end of this shaft is provided with a bearing 102 which rotatably engages within the top or cover member 104 of receptacle 28a. Suspended from the underside of this cover and fixedly attached thereto is a screen 106 of truncated formation. Located below the screen is a plate 108 which permits the treated materials to pass between its peripheral edges and casing 28a to a trough not shown but the same as 34 of FIGURE 1. Shaft 24a drives the double worm member 110, it being understood that the outer casing 28a, cover 104, screen 106, and the coil 94, the latter being brazed to the casing, are all stationary. The shaft 24a, therefore, drives the double worm member 110 whose convolutions are gradually wider from bottom to top but are slightly spaced from or in substantial contact with the inclined walls of screen member 106. The blades 200 fixed to shaft 100 wipe against the upper surface of the screen bottom, the latter being held in non-rotative position by the upper inside walls of the casing 28a to which the screen may be held by friction or by brazing, welding, etc. In the construction shown, the double screw or worm 110 is provided with sharp edges 112.

The construction shown in FIGURE 4 includes a large receptacle 28b, used for skinning potatoes and the like, and is adapted to replace or be exchanged for smaller receptacle 28 or 28a. Base portions 10a of FIGURE 3 and 10b of FIGURE 4 may include the heating and cooling means diagrammatically shown in FIGURE 2. In such case, the receptacle 28b will be of double wall construction as shown at 68 and 70 of FIGURE 2.

Referring now to FIGURE 5, it will be understood that any one of the constructions, including the receptacles 28, 28a, and 28b, may be provided with a combined hopper gate and screen, as shown in FIGURE 5, it being further understood that each of the receptacles in such case will be provided with a pair of guides 114, such as shown in FIGURE 1, having overhanging spaced flanges 116 whereby said edges of the combined hopper gate and screen 118, forming the FIGURE 5 construction, may readily slide in a vertical direction.

As shown in FIGURE 5, the combined hopper gate and screen is of arcuate cross section so that it closely fits the circular inside wall of the receptacle 28. A portion 120 of this member is of solid material and the lower portion 122 forms a perforated screen, and either portion may be used by being slid in a vertical direction. The screen may be held in adjusted position in a vertical direction in the guides 114. When the hopper and gate portion are pushed downwardly until the perforated portion 122 registers with the outlet 126, as shown in FIGURE 2 of the receptacle, the contents of the receptacle will readily flow downwardly through the trough 34, 34a or 34b. However, when the combined hopper gate and screen is removed and reversed, the screen 122 will then be out of alignment with the opening 126, 126a or 126b, but the solid portion 120 will close the opening and the contents of the receptacle during the action of any one of the operating tools, such as shown in the several figures referred to in Patent 2,691,997 or in FIGURES 1 and 2 herein, will become chilled or heated to a desired degree as the operation of mascerating, grinding, etc. continues. When the material has been thoroughly chopped, sliced, etc. and heated or chilled, it may then be released to flow out of the trough 34, 34a, or 34b.

The function of the screen in FIGURE 5 is to prevent the passage of undesirable portions of food, such as the nerves, skin, and bones of meat, seeds of fruit, and strings of vegetables, or other undesirable portions. By using screens of various sizes, having different sized holes in the screens, one screen may be replaced for another. In other words, the structure in FIGURE 5 may be replaced by a structure having smaller or larger holes indicated at 122.

It will therefore be seen that I have provided a very versatile food machine for accomplishing a plurality of different purposes on a plurality of different materials, said materials being treated at a regulated temperature by means of the heating or cooling means and the thermostatic means of each, the several elements being all contained in a single unitary device. The different operations of chopping, pulverizing, mascerating, slicing, grating, etc., may be accomplished by using the different elements noted in my said patent referred to above and the several figures herein.

Since the food is not forced, i.e. not cut, between the metal surfaces, this machine is different from any previous machine, as it uses a different principle from that used by existing machines. Due to this new principle, the undesirable parts of food are discarded instead of being cut up and mixed with the desirable food, the undesirable parts being noted above as well as any other parts that are undesirable. The processed food will preferably be ejected from the receptacle 28a by the centrifugal force of the action of the disc 108 and screen 106 against the processed food, thereby forcing it out into the chute 34.

In the claims the word "grinding" includes any one of the following operations or similar operations, i.e., grinding, grating, pulverizing, slicing, shredding, mashing, mascerating, and the expression of pulp and juice from vegetables and fruits as well as meat.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:
1. A food treating machine comprising a container of inverted truncated conical form, said container having a base and a side of screen formation, said base having a central opening, a source of power having a shaft extending upwardly through said opening, a worm-like element in said container, connected to said shaft, said worm-like element having peripheral edges in substantial contact with the inside surface of the wall and base of said container.

2. The structure of claim 1 wherein said machine is provided with a receptacle surrounding said container.

3. The structure of claim 2 wherein said machine is provided with means for cooling the said receptacle.

4. The structure of claim 2 wherein said machine is provided with means for heating the said receptacle.

5. The structure of claim 2 wherein said container is provided with a perforated base spaced from said receptacle.

6. The structure of claim 2 wherein said receptacle is provided with a side opening and means for adjustably opening and closing said opening.

7. The structure of claim 2 wherein said container is provided with a cover member forming a cover for said container and having a bearing for said worm-like element.

References Cited in the file of this patent

UNITED STATES PATENTS

| 466,751 | Gardner | Jan. 5, 1892 |
| 2,483,472 | Matarrese | Oct. 4, 1949 |
| 2,691,997 | Matarrese | Oct. 19, 1954 |
| 2,843,169 | Stein | July 15, 1958 |

FOREIGN PATENTS

| 742,343 | Great Britain | Dec. 21, 1955 |